May 24, 1938.　　　L. G. LARSEN　　　2,118,515
SLOTTING MACHINE
Filed May 22, 1937　　　2 Sheets-Sheet 1
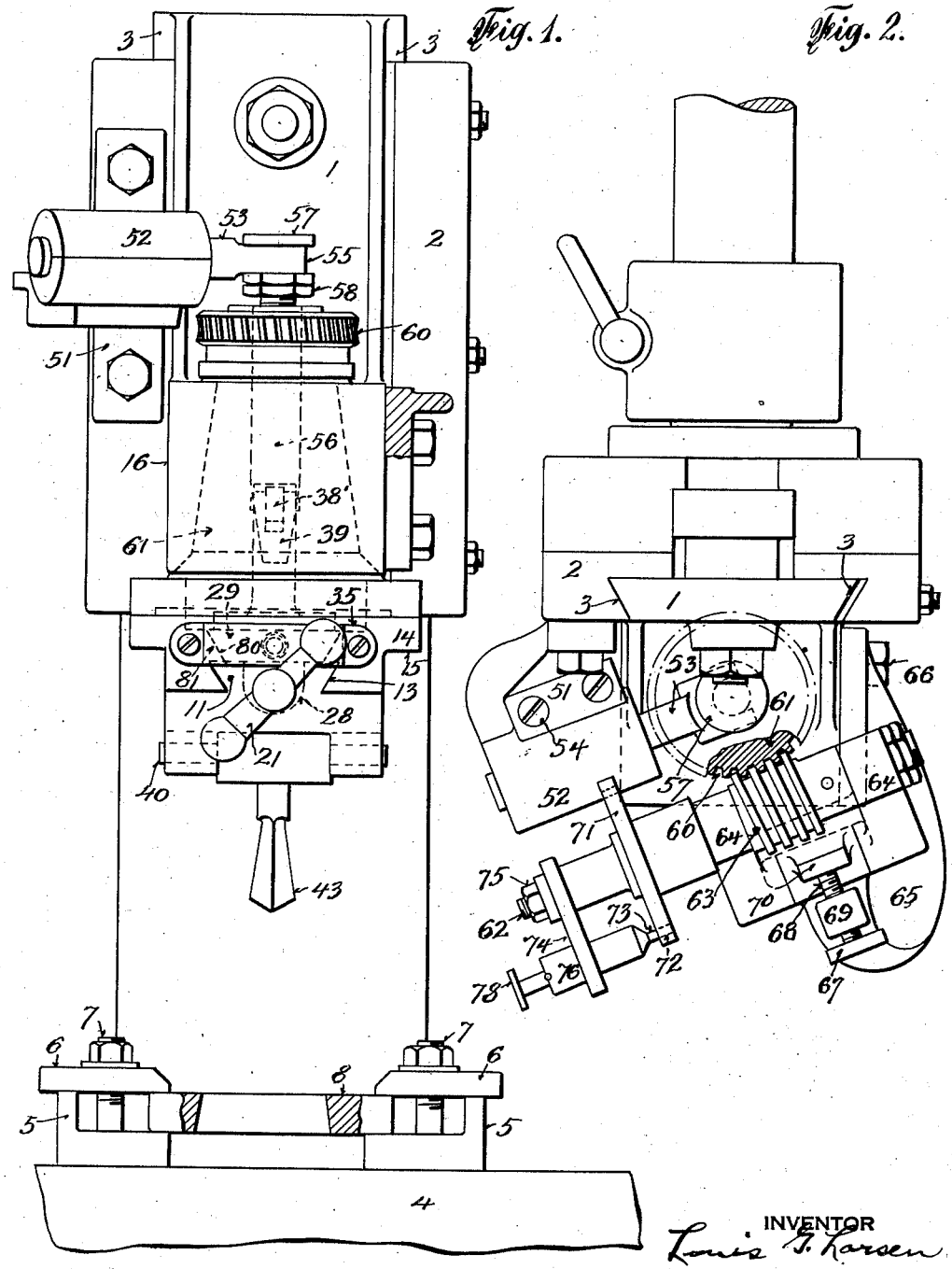
INVENTOR
Louis G. Larsen
BY
Charles G. Hensley
ATTORNEY

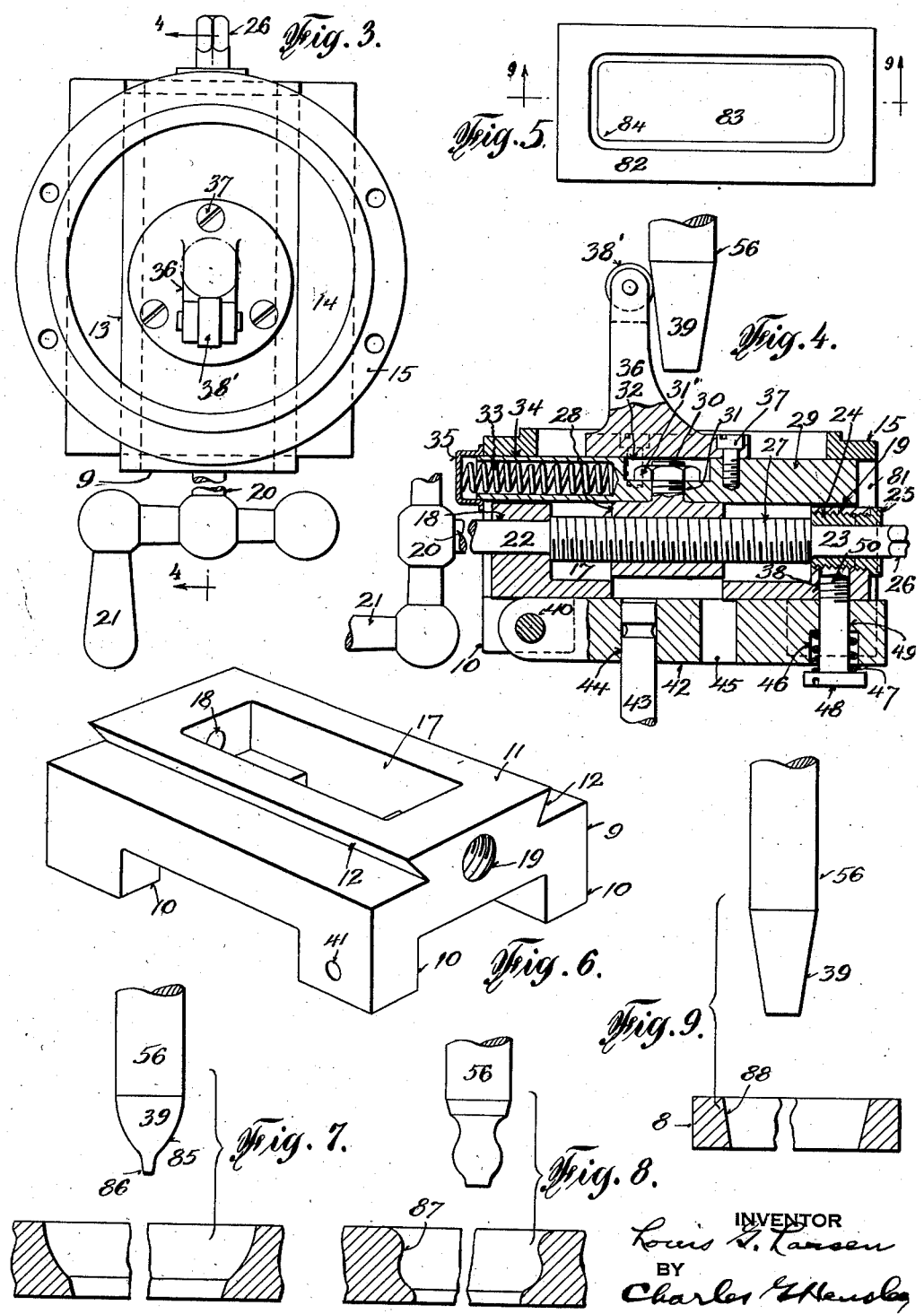

Patented May 24, 1938

2,118,515

UNITED STATES PATENT OFFICE 2,118,515

SLOTTING MACHINE

Louis G. Larsen, Jersey City, N. J., assignor, by direct and mesne assignments, to Wirthsen Associates, Inc., New York, N. Y., a corporation of New York Application May 22, 1937, Serial No. 144,224

8 Claims. (Cl. 90—24.3)

My invention relates to slotting machines, and while not limited to a particular use, it is especially adapted for slotting plates or blocks of metal from which dies, moulds and similar articles are made. In my co-pending application Serial No. 131,114, filed March 16, 1937, I showed and described a machine for slotting plates and the like, and the present invention embodies or includes the principal features of the aforesaid application.

Different types of slotting machines have been made for slotting plates, which are to form blanking dies, which machines are capable of forming various rectangular slots with the edges cut at an angle to provide clearance when the article is used as a stamping die and in all machines known to me it has been necessary to form a bevel or clearance in the plate or block of metal in the corners by hand work after the straight cuts were made.

With the present machine it is possible not only to cut the rectangular portions of the slot for openings in a piece of work, but it is possible to cut the corners where two angular sides meet, or where a curve and an angular side meet, so that the necessity of forming this portion of the work by hand is entirely eliminated, thereby saving considerable hand labor and the incident expenses in the making of dies.

Another object of my invention is to make it possible to form curved portions of various arcs and of various shapes in a piece of work without having to provide a circular table which is expensive and clumsy, whereas the means for making arcuate and circular cuts in the present machine is simple and compact, as well as inexpensive in construction.

Another object of the present machine is to provide means for slotting a piece of work in such manner that the wall of the slot may be tapered with the taper inclining inwardly or outwardly, and to make it possible to have the wall of the slot shaped to any particular configuration, such as with curves, reverse curves, and a multitude of other shapes, so that the slotted piece of work may be used as a mould or die for the casting or pressing of various materials.

Where an opening of circular shape is to be made in a piece of work, it may readily be cut on a lathe, but where the opening is of rectangular shape or polygonal shape it is possible to slot the material with the present machine much more readily and to give any configuration to the wall of the slot. It is also possible with the present machine to mitre the corners where the walls of different configuration meet at an angle, or in other words, I can accomplish all of the objects set forth in connection with the machine in my said co-pending application and in addition shape the walls of the slot in any desired configuration.

Other objects of my invention will be set forth in the following detailed description.

In the drawings forming part of this application,

Figure 1 is a front elevation of a portion of a slotting machine embodying the features of my invention, Figure 2 is a plan view thereof.

Figure 3 is a plan view of a portion of the device with parts above it removed,

Figure 4 is a sectional view taken on the line 4—4 of Figure 3,

Figure 5 is a plan view of a blank which may be made in connection with the present machine, Figure 6 is a perspective view of a slide embodied in the construction, Figure 7 is a sectional view of a piece of work and showing the type of controlling member for causing the groove to be cut in the form shown in the piece of work, Figure 8 is a similar view showing a different shape of groove which may be cut with a different controlling member, and Figure 9 is a similar view of a plane tapered wall slot which may be made in the work by the type of controlling member shown in this figure.

The reciprocating head 1 is adapted to reciprocate in a guiding frame 2 with which it has a dovetail connection 3. The reciprocating head may be operated by the same type of crank motion shown in my said co-pending application or it may be operated by any type of mechanism for producing a reciprocation of the head. The present device may be embodied in a milling machine of the character shown in said co-pending application, or it may be manufactured complete as a separate and distinct machine, but in any event some means either that shown in my said co-pending application, or any other means, may be used for reciprocating the head 1.

At 4 I have shown a portion of the bed of the machine on which are mounted clamping devices 5 having clamping plates 6 held down by bolts 7 to secure the piece of metal 8 constituting the piece of work in position under the reciprocating head, so that the tool for performing the slotting operation may reciprocate vertically and cut through the piece of work in the manner hereinafter described.

There is a sliding member shown in perspective in Figure 6, and in section in Figure 4, and in plan in Figure 3. This consists of a preferably rectangular body 9 of metal having four downwardly extending feet or posts 10 at four corners thereof, and at the upper side of this sliding member there is a projection 11 having undercut or dovetail side edges 12 which have a sliding engagement with the dovetail groove 13 formed in the block 14 which is carried by the reciprocating head 1 so that the sliding piece moves up and down with the reciprocating head. The block 14 has a lateral flange 15 which is bolted to the barrel 16 the latter being carried by the reciprocating head 1. The block 9 as is shown, is provided with a chamber or open space 17 extending downwardly within the raised portion 11 of the block which has the dovetail walls 12 on opposite sides thereof. There are apertures 18, and 19 through the ends of the block 9 adjacent the chamber 17, one of which is shown as having a smooth bore and the other having a threaded bore.

There is a threaded shaft 20 one end of which projects beyond the block 9 and it is provided with an operating crank handle 21 which is adapted to revolve the threaded shaft. The portion 22 of the shaft is smooth and has its bearing in the non-threaded aperture 18 in one end wall of the block 9. The other end 23 of this shaft is also smooth and has its bearing in a bushing 24 which is threaded into the threaded aperture 19 of the block 9 and a lock nut 25 which is also threaded into this aperture presses against the bushing 24 and locks the latter against turning action within the block 9. The right hand end of the threaded shaft in Figure 4 and the upper end in Figure 3 may be made polygonal or square, as shown at 26 so that the crank handle 21 in the left of Figure 4 may be removed from this end of the shaft and may be applied to the squared end 26 at the opposite side of the shaft, if desired.

The intermediate portion of the shaft is threaded as shown at 27 and this portion of the shaft engages a threaded bore in a sliding nut 28. This sliding nut is shown as made separate from the slide 29 although it may be made integral therewith if desired. The nut 28 is shown as provided with an upwardly extended and threaded stem 30 which passes through an opening 31 extending upwardly from the lower side of the slide 29 and a nut 31' threaded onto this stem secures the nut 28 to the slide 29, the nut lying in and being concealed in a recess 32 formed in the upper portion of the slide 29.

It will be apparent that by revolving the threaded shaft clockwise or counterclockwise, the nut 28 and the parts carried by it, to wit, the slide 29 may be moved to the right or left in Figure 4. There is a coiled spring 33 mounted in a bore 34 formed in the slide 29 one end of the spring pressing against the bottom of this bore and the other pressing against a cap 35 secured to the slide, the spring tending to move the slide from left to right in Figure 4 for a purpose which will appear hereinafter. There is a post 36 shown as bolted to the slide 29 by the screws 37 and this post extends upwardly and is provided with an idler roller 38 which presses against and rides on the surface of the controlling member 39.

There is a pin 40 extending through apertures 41 in two of the legs 10 of the slide 9 and this pin forms a hinge connection between a horizontally lying plate 42 of a strip block. The cutting tool shown at 43 in Figure 4 and in Figure 1 has its shank locked in a bore 44 in the trip block, so that the point of the tool extends downwardly in position to engage the piece of work.

I have shown another bore 45 to receive the cutting tool to bring it nearer the axis of the member 56, so that the tool may be placed in this bore when cutting on small arcs whereas it will be placed in the bore 44 when cutting on larger arcs. One end of the trip block is provided with a bore 46 extending upwardly from its bottom side in which is seated a coiled spring 47 which at one end presses on the top of the bore 46 and the other end presses downwardly on the head of the screw 48 which passes upwardly through the sub bore 49 in the trip block and the upper end of this screw is threaded into a bore 50 in the under end of the slide 29. The coiled spring 47 normally holds the trip block pressed against the under side of the slide 29 for the downward stroke of the reciprocating head, and on the up stroke of the trip block is adapted to rock on the pin 40 so that the cutting tool may glide over the surface of the work on the return stroke of the reciprocating head. Trip blocks of this character are well known in shaping machines and other machines for allowing a cutting tool to escape on the work during a back stroke.

There is a bracket 51 mounted on the stationary frame 2 of the machine and it has a barrel shaped, two-part bearing 52 having a central opening therethrough to receive the horizontally extending bar 53 the bar being adjustable lengthwise in the bearing block, the screws 54 adapted to loosen the upper bearing member 52 from the lower bearing member to permit the lengthwise adjustment of the bar 53.

On the outer or free end of the bar 53 there is a bearing member 55 which surrounds a vertical post 56 the post having a flange 57 on its upper end seating against the upper face of the bearing member 55 and the nut and lock nuts 58 are threaded onto the post 56 and are adapted to be tightened against the under surface of the bearing member 55 to co-operate with the flange 57 in securely holding the vertical post 56 rigidly in position and preventing it from revolving in relation to the bracket 51 and therefore in relation to the reciprocating head. It will be apparent from this that the post 56 does not reciprocate with the reciprocating head.

The antifriction roller 38 has a rolling contact with the lower end 39 of the post 56 as shown in Figure 4, and the contour or profile of the lower end of this post determines the character of cut which a tool makes in a piece of work, as will be more fully explained hereinafter.

The roller 38 is pressed toward the lower end 39 of the post by the action of the spring 33 exerting pressure on the slide 29 which carries the post 36. There is a worm gear 60 mounted upon or made integral with the vertical member 61 which carries the blocks 9 and 29 and the parts associated with them. The worm 63 is mounted on the shaft 62 which has its bearings in the forks 64 mounted in the bracket 65 which is mounted by means of bolts 66 on the stationary frame of the machine. The worm 63 is adapted to mesh with the worm gear 60 for the purpose of turning or indexing the member 61 and if desired the worm may be disengaged from the worm gear 60 by operating the hand member 67 on the screw 68 which is threaded in the arm 69 and which screw presses on the lug 70 to move the bracket 64 which carries the worm, for the purpose of moving the worm into or out of mesh with the worm gear 60.

There is an indexing disc 71 stationarily mounted and disposed around the worm shaft 62 this disc being provided with a number of apertures 72 arranged concentrically around the axis of the shaft 62 to receive a locking pin 73 which is part of the indexing device. The arm 74 attached to the shaft 62 by means of the nut and washer 75 is adapted to turn the shaft 62. On the outer end of this arm there is a casing 76 which contains a spring (not shown) for moving the plunger 73 to insert its end into any one of the apertures 72 of the indexing disc 71. By pulling on the knob 78 on the outer end of the plunger 73 the latter may be withdrawn from any of the apertures 72 in the indexing disc 71 to permit the worm shaft to be revolved.

The slide 29 has dovetail side edges 80 which travel in a second dovetail groove 81 in the block 14.

Operation

In Figure 5 I have shown a piece of work 82 in which an opening 83 has been formed with the present machine, this opening being substantially rectangular with rounded corners 84 and the wall of the opening being beveled or inclined so that the piece of work may be used as a blanking die, the bevel providing clearance for well known purposes. For slotting openings having a simple or plain bevel like that shown in Figure 5, the end 39 of the post 56 will have its lower end shaped frustoconical as shown in Figure 4. As shown in Figure 7, the member 39 may have its lower end shaped to provide rounded portions 85 with a reduced or nipple portion 86 at the lower end and when a post of this type is used the wall of the cut made through the piece of work will be shaped like the wall in Figure 7. In other words, the cut made by the tool will produce a wall the profile of which corresponds with the profile of the lower end of the post.

In Figure 8 I have shown work slotted so that the wall of the slot is provided with a reverse curve 87. The post 56 having its lower end shaped as shown in Figure 8 is used to control the operation of the tool for producing the type of curved wall shown in this figure.

In Figure 9 the work is slotted to provide an inclined wall 88 corresponding with the profile at the lower end of the post in this figure. This form of post and the wall produced by it correspond with the showing in Figures 4 and 5.

Usually a hole is drilled through the piece of work or many holes may be drilled inside the contour of the final opening in order for the tool to be able to pass through the piece of work in the beginning of its operations. The machine is set into operation so that the head 1 and the parts carried by it, including the tool, reciprocate vertically and the tool is caused to pass downwardly through the piece of work which is held by the clamps 6.

The member 78 may be drawn out to unlock the member 74 and then the member 74 may be revolved in either direction to revolve the shaft 62 and the worm 63. The latter will act on the worm gear 60 and thus revolve the member 61 which carries the tool with it. This operation is to index the tool, i. e., position its point in any direction around its axis. The slides on the bed of the machine such as are shown in my said copending application, may be adjusted to bring the piece of work in proper relation to the path of the tool. If straight away slotting is to be performed then the crank 21 may be operated to bring the point of the tool in the axial line of the reciprocating head, whereas if arcuate or circular slotting is to be performed then the crank 21 will be operated to bring the point of the tool out of the axial line of the reciprocating head a distance corresponding with the radius of the circular slot to be cut.

Operation of the crank 21 causes the threaded portion 27 of the shaft 20 to act on the nut 28 and thus move the block 9 and as the latter carries the tool holder the tool will be moved the desired distance from the axis of the reciprocating head.

The slide 29 will be constantly urged by the spring 33 in a direction to retain the roller 38 in contact with the profile member 39.

If the machine is started in operation the reciprocating head will be caused to reciprocate vertically, its path being constant. As the head reciprocates, it will be understood that the post 56 remains stationary so that the member 36 and the roller 38 will reciprocate vertically in relation to the post 56, as will all other parts carried by the reciprocating head. At each reciprocation of the head the roller 38 will follow the shape of the contour member 39, whatever it may be. The slide 29 will reciprocate laterally of the axis of the head according to the control of the contour member 39. The path of the point of the tool as it moves up and down will correspond with the contour or shape of the contour member 39. If this member is frustoconical as shown in Figures 4 and 9 then the point of the tool will take a diagonal path due to the reciprocation of the head and the lateral movement of the slide 29 and the cut will be like that shown in Figure 9, i. e., the wall 88 of the cut will be inclined, as for clearance in a blanking die.

If the contour member 39 is shaped like in Figure 7 then the point of the tool will take a path corresponding with the contour of the contour member in this view and the shape of the wall of the cut will be as shown in this view. If the contour member is shaped as shown in Figure 8, then the point of the tool will take a corresponding path and the wall of the cut will be shaped as shown in this figure which is a reverse curve. It will be apparent that the contour members may be given a great variety of shapes to produce different contours in the wall of the slot in the work.

If the opening or slot is to have an arcuate or circular contour then the indexing device may be operated to revolve the member 61 and thus change the direction of the pointing of the tool as the cut progresses. It will be understood that the block 9 will have been adjusted by the crank 21 to place the point of the tool laterally of the axis of the head, a distance equal to the radius of the arcuate or circular cut being made. Thus, while the point of the tool is moving around an arc the point of the tool is directed toward the arc by the indexing of the member 61 which carries the tool holder around with it.

Where a straight away cut is to be made the member 61 may be left in the necessary position and the slides of the machine may be operated to cause the work to move in a rectilinear direction in relation to the point of the tool.

If the contour member 39 is circular as shown in the drawings, then as the member 61 is indexed the roller 38 will travel around the contour member 39 and the tool point will continue to take a similar path but its "path" will face in different directions according to the indexing of the member 61.

When a plate is to be slotted in the shape shown in Figure 5 most of the work, or cutting along the straight edges may be performed by moving the work holding slides of the machine and the member 61 need only be indexed when making the rounded corners 84. If straight edges meet or a straight edge and an arcuate cut meet, then the member 61 may be indexed to mitre the corners.

It will be apparent that the contour members 39 may be readily turned out on a lathe to various shapes and that they may cause the tool of the present machine to make a great variety of cuts in the work. The present machine may be used for making moulds for moulding or pressing materials such as rubber, bakelite, celluloid and a variety of materials as well as for making moulds for die casting.

The trip box shown herein is used for the same reason that such devices are used in other machines, i. e., to allow the tool to trip over the work on the back or up stroke.

Having described my invention, what I claim is:

1. A slotting machine, including a reciprocating head, means for causing it to move in a rectilinear direction, a tool holder mounted on said head, means for causing it to have lateral, rectilinear, sliding movement only in relation to said head but permitting it to revolve on said head on an axis parallel with the movement of said head, means for reciprocating said head and means for automatically causing said tool holder to slide laterally as the head reciprocates, including a circular, stationary contour member, and means associated with said tool carrying member and revolvable around and engaging with and following the shape of said contour member, and adapted to cause lateral sliding movement of the tool holder as the head reciprocates, whereby a tool in said tool holder is caused to move through a piece of work and to produce a wall at the side of the slot conforming to the shape of said contour member.

2. A slotting machine including a reciprocating head, means for causing it to move in a rectilinear direction, a tool holder mounted on said head, means for causing it to have lateral, rectilinear, sliding movement only in relation to said head but permitting it to revolve on said head on an axis parallel with the movement of said head, means for reciprocating said head, means including a contour member for automatically causing said tool holder to slide laterally as the head reciprocates, and means for indexing said tool carrying member around said contour member.

3. A slotting machine including a reciprocating head, means for causing it to move in a rectilinear direction, a tool holder mounted on said head, means for causing it to have lateral, rectilinear, sliding movement only in relation to said head but permitting it to revolve on said head on an axis parallel with the movement of said head, means for reciprocating said head and means for automatically causing said tool holder to slide laterally as the head reciprocates, including a circular, stationary contour member and a roller associated with said tool carrying member, said tool carrying member and said roller being mounted to revolve around said contour member and said roller rolling lengthwise against said contour member as the head reciprocates, to follow the shape of the contour member and produce corresponding sliding movements of the tool holder, whereby a tool in said tool holder is caused to move through a piece of work and to produce a wall at the side of the slot conforming to the shape of said contour member.

4. A slotting machine including a reciprocating head, means for causing it to move in a rectilinear direction, a tool holder mounted on said head, means for causing it to have lateral, rectilinear, sliding movement only in relation to said head but permitting it to revolve on said head on an axis parallel with the movement of said head, means for reciprocating said head and means for automatically causing said tool holder to slide laterally as the head reciprocates, including a circular, stationary contour member and a roller associated with said tool carrying member, said tool carrying member and said roller being mounted to revolve around said contour member and said roller rolling lengthwise against said contour member as the head reciprocates, to follow the shape of the contour member and produce corresponding sliding movements of the tool holder whereby a tool in said tool holder is caused to move through a piece of work and to produce a wall at the sides of the slot conforming to the shape of said contour member, and means for indexing said tool holder axially around said contour member while said head is operating.

5. A slotting machine including a reciprocating head, means for causing it to move in a rectilinear direction, a tool holder mounted on said head, means for causing it to have lateral, rectilinear, sliding movement only in relation to said head but permitting it to revolve on said head on an axis parallel with the movement of said head, means for reciprocating said head and means for automatically causing said tool holder to slide laterally as the head reciprocates, including a circular contour member, means associated with said tool carrying member and revolvable around and engaging with and following the shape of the contour member, springs mean for causing said engaging member to be pressed against the contour member, said contour member adapted to cause lateral, sliding movement of the tool holder as the head reciprocates, whereby a tool in said tool holder is caused to move through a piece of work and to produce a wall at the side of the slot conforming to the shape of said contour member.

6. A slotting machine including a reciprocating head, means for causing it to reciprocate in a rectilinear direction, a slide, a tool holder carried thereby, a second slide carrying said first slide, means for causing said first slide to have rectilinear, sliding movement at right angles to the movement of said head, and permitting it to revolve around an axis parallel with the movement of said head, and means for causing said tool holder and said first slide to slide laterally as the head reciprocates, including a circular, contour member, means associated with said first slide and revolvable around and engaging with and following the shape of said contour member, and means for adjusting said first slide laterally of the axis of said contour member.

7. A slotting machine including a reciprocating head, means for causing it to reciprocate in a rectilinear direction, a slide carried by said head and mounted to move in a rectilinear direction thereon, a stationary circular contour member, means associated with said slide and engaging and following the shape of said contour member, and revolvable around the same, said contour member adapted to cause a lateral movement of said slide as the head reciprocates, means for indexing said slide around the axis of said contour member, a second slide mounted on said first slide, a tool holder carried by said second slide, and means for adjusting the relative positions of said slides to vary the distance of the point of a tool in said tool holder to the axis of said contour member.

8. In a slotting machine a head supported to have reciprocatory movement in a rectilinear direction, means to reciprocate the head, a tool holder mounted on the head to participate in the reciprocatory movement thereof and have sliding movement transversely of the head and arranged to carry a tool to extend below the holder in the plane of the movement thereof, means to impart predetermined sliding movement to the tool holder transversely of the head as the tool holder is reciprocated with the head, including a fixed contour member disposed axially of the tool holder, a follower associated with the tool holder engaging and adapted to follow the contour member and transmit sliding movement to the tool holder transversely of the head conformably to the shape of the contour member by the reciprocatory movement of the head and cause the tool carried by the tool holder to be moved through a piece of work and produce a slot therein having a side wall conforming to the shape of the contour member.

LOUIS G. LARSEN.